United States Patent [19]

Stifter

[11] 4,259,705
[45] Mar. 31, 1981

[54] COMBINATION SURGE SUPPRESSOR FILTER

[76] Inventor: Francis J. Stifter, 171 S. Main St., Natick, Mass. 01760

[21] Appl. No.: 24,379

[22] Filed: Mar. 27, 1979

[51] Int. Cl.³ .............................................. H02H 7/20
[52] U.S. Cl. ...................................... 361/56; 361/110; 361/113; 361/118; 333/12
[58] Field of Search ................... 361/113, 56, 91, 110, 361/111, 118, 119, 1; 333/12, 202, 119, 17 L

[56] References Cited

U.S. PATENT DOCUMENTS

| | | | |
|---|---|---|---|
| 2,939,095 | 5/1960 | Chertok | 361/113 X |
| 2,943,272 | 6/1960 | Feldman | 333/12 X |
| 3,372,285 | 3/1968 | Blazek et al. | 361/111 X |
| 3,693,053 | 9/1972 | Anderson | 361/118 X |
| 3,705,365 | 12/1972 | Szabo et al. | 333/12 |
| 4,038,990 | 8/1977 | Thompson | 333/12 X |
| 4,089,032 | 5/1978 | Orfano | 361/111 X |
| 4,095,262 | 6/1978 | St. Clair | 361/1 |

*Primary Examiner*—Patrick R. Salce
*Attorney, Agent, or Firm*—John E. Toupal

[57] ABSTRACT

The invention is an electronic isolation and surge suppression system including a housing defining cord and socket openings and retaining a surge suppressor connected to one end of an electrical cord, the other end of which terminates with a plug adapted for connection to an AC power source. Also retained by the housing are a plurality of multiple terminal electrical socket means and an electrical circuit connecting the sockets in a parallel combination that is in series with the suppressor. The electrical circuit includes an electrical filter connected between each of the socket means and the suppressor. Large voltage surges are eliminated by the suppressor, while the individual filters provide electrical isolation between electronic equipment connected to the individual sockets and isolation from AC power line noise and transients.

8 Claims, 7 Drawing Figures

COMBINATION SURGE SUPPRESSOR FILTER

BACKGROUND OF THE INVENTION

This invention relates generally to the protection of electrical equipment and, more particularly, to a combination isolator and line surge suppressor for electronic devices.

A well-known cause of damage to electrical equipment is the high voltage line surge. Such line surges often produce voltages above the rated capacity of electronic components and can either produce catastrophic failure thereof or a gradual weakening that ultimately leads to failure. In addition to component failure, line surges can introduce electrical interference that degrades the performance of many devices including scientific instruments, test apparatus, chemical process controllers and data handlers, audio equipment, video recorders and television equipment. Particularly affected by interference are computers and computer peripheral equipment in which electrical noise can introduce inadvertent bits that ruin programs. Although devices are available for adequately suppressing line surges, such devices fail to eliminate effectively the above-described performance degrading interference in electrical equipment. Although conventional suppressors function to eliminate voltage spikes above a given maximum level they fail to eliminate voltage transients in the range between peak line voltage and that given maximum level. Such voltage transients can produce the performance degrading interference described above. Thus, presently available surge suppressors do not satisfactorily eliminate the problem.

The object of this invention, therefore, is to provide a device that will both protect and prevent faulty operation of various types of electronic equipment.

SUMMARY OF THE INVENTION

The invention is an electronic isolation and surge suppression system including a housing defining cord and socket openings and retaining a surge suppressor connected to one end of an electrical cord, the other end of which terminates with a plug adapted for connection to an AC power source. Also retained by the housing are a plurality of multiple terminal electrical socket means and an electrical circuit connecting the sockets in a parallel combination that is in series with the suppressor. The electrical circuit includes an electrical filter connected between each of the socket means and the suppressor. Large voltage surges are eliminated by the suppressor, while the individual filters provide electrical isolation between electronic equipment connected to the individual sockets. Thus, the invention provides a compact unit that substantially eliminates high voltage transients that could either damage or degrade the performance of electronic equipment.

In a preferred embodiment of the invention, the suppressor comprises a varistor connected between each pair of lines in a three-wire system and each filter comprises three inductor windings each connected in one line of the three-wire system and all wound on a common toroidal core. The suppressor provides both differential and common mode surge voltage protection while the use of an inductor in the ground line as well as in the hot and common lines effectively eliminates degrading intermediate voltage transients in the equipment connected to the sockets.

One feature of the above invention comprises a filter with hot and common line inductors bifilar wound on the common core so as to prevent core saturation with high line current. Also, additional isolation is provided by capacitors connected between each pair of lines in the three-wire system.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENTS

Figure 1:
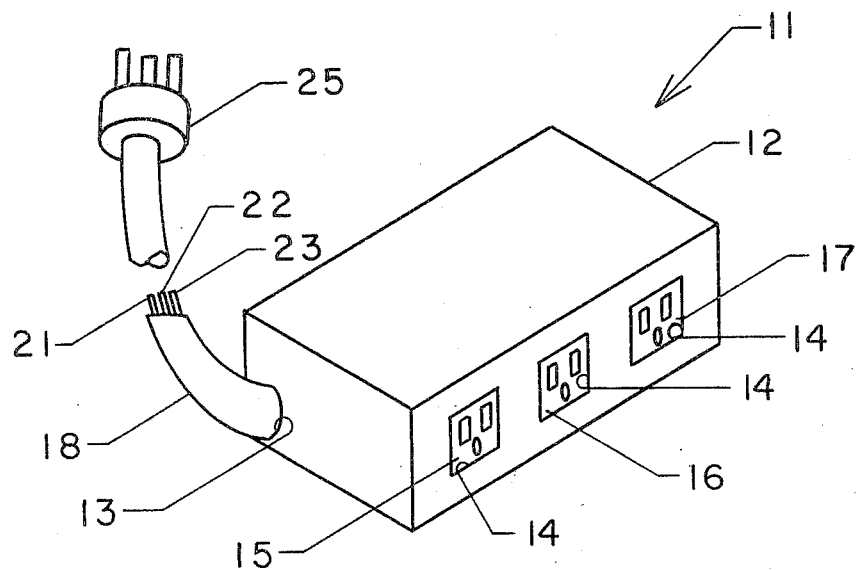
FIG. 1 is a schematic perspective view of one embodiment of the invention.

Referring now to FIG. 1, there is shown an electrical isolation and surge suppression device 11 according to the invention. The device 11 includes a housing 12 that defines a cable opening 13 and a plurality of socket openings 14. Retained in each of the socket openings 14 is a three-terminal socket 15-17 for receiving conventional three-terminal electrical plugs. A cord 18 extends through the cord opening 13 and retains three electrical conductors 21-23. Attached to the outer end of the cord 18 and connected to the conductors 21-23 is a conventional three-terminal electrical plug 25.

Figure 2:
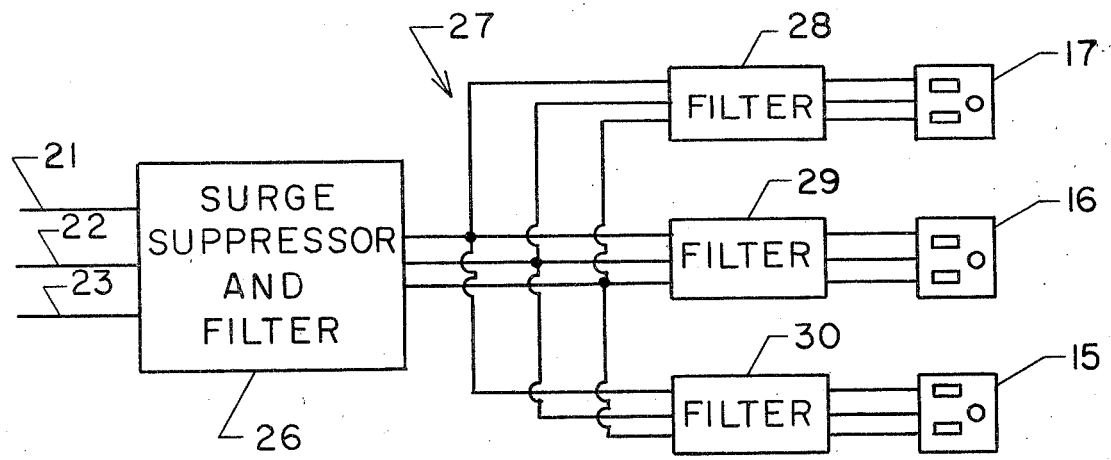
FIG. 2 is a schematic block circuit diagram of the embodiment shown in FIG. 1.
Figure 3:
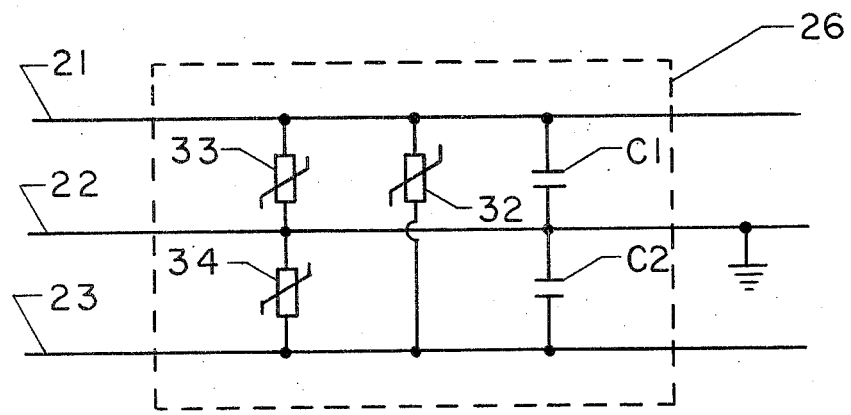
FIG. 3 is a schematic circuit diagram of the suppressor shown in FIG. 2.

Referring now to FIG. 2, there is shown in block diagram form an electrical circuit retained by the housing 12. A combination surge suppressor and filter 26 is connected to the three conductors 21-23 of the electrical cord 18. Also connected to the suppressor and filter combination 26 by a circuit 27 is a combination of three filters 28-30 connected in parallel. Each of the filters 28-30 is connected to a different one of the sockets 15-17. FIG. 3 shows in greater detail the combination suppressor and filter 26 shown in FIG. 2. Included in the combination 26 is a varistor 32 connected between the hot line 21 and the common line 23, a varistor 33 connected between the hot line 21 and the ground line 22 and a varistor 34 connected between the common line 23 and the ground line 22. Also in the combination 26 is a capacitor C1 connected between the hot line 21 and the ground line 22 and a capacitor C2 connected between the ground line 22 and the common line 23.

Figure 4:
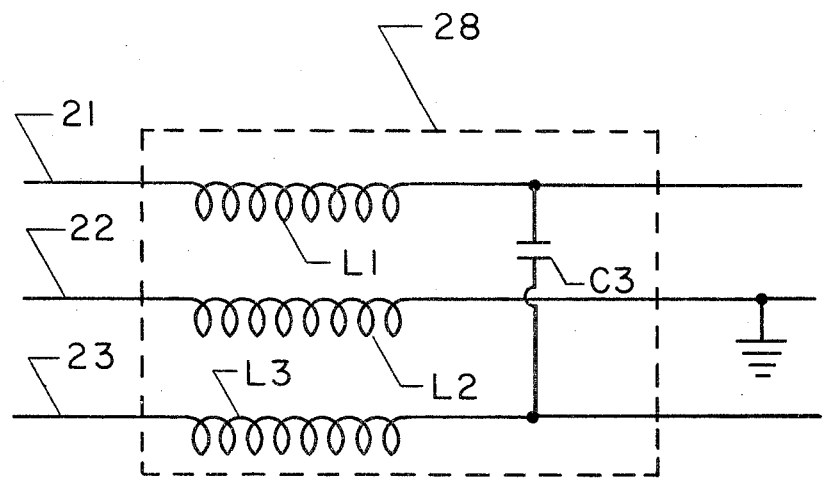
FIG. 4 is a schematic circuit diagram of one of the filters shown in FIG. 2.
Figure 5:
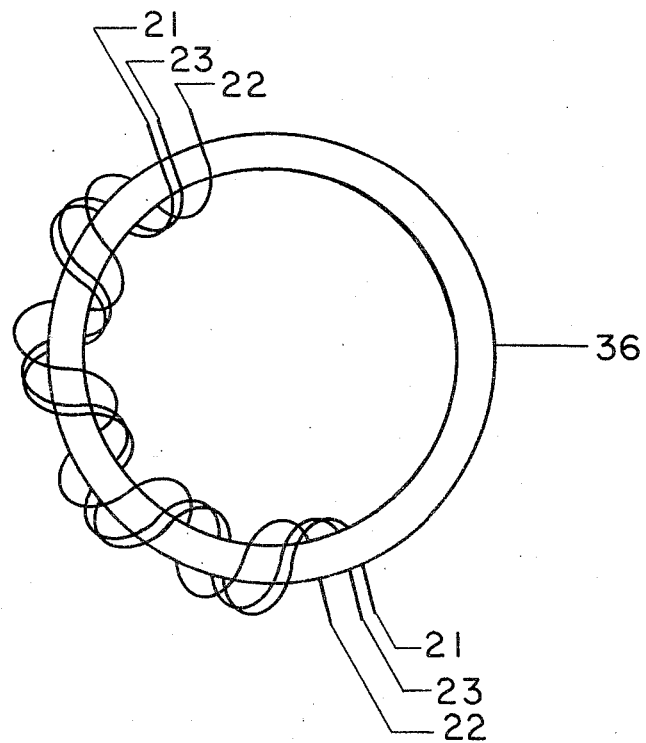
FIG. 5 is a schematic diagram illustrating an inductor device utilized in the circuit of FIG. 4.

The filters 28-30 are of identical construction and a circuit diagram of one 28 is shown in FIG. 4. An inductor L1 is connected in the hot line 21, an inductor L2 is connected in the ground line 22 and an inductor L3 is connected in the common line 23. Also a capacitor C3 is connected between the hot line 21 and the common line 23. As illustrated in FIG. 5, the inductors L1, L2 and L3 are formed by winding the lines 21-23 on a common toroidal core 36. The inductors L1 and L3 are formed by a bifilar winding of the hot and common lines 21 and 23 while the inductor L2 is formed by separately winding the ground line 22.

During use of the device 11, the plug 25 is inserted into a suitable AC power source and desired electronic equipment, for example a computer and peripheral accessores therefor, are individually plugged into the sockets 15–17. The varistors 32–34 prevent damage to the connected equipment by clipping line voltages above a given maximum, for example above 200 volts, and thereby suppress power line surges, spikes or transients. Differential surge voltage protection is provided by the varistor 32 while common mode line surge voltage protection is provided by the varistors 33 and 34. In addition, the filter portion of the combination 26 and the filters 28–30 function to isolate the connected equipment from performance degrading intermediate voltage spikes in the range between peak AC line voltage and the set point of the varistors 32–34. The permability of the toroid core 36 provides the inductors L1 and L3 with a high inductance that establishes power line isolation and the high inductance L2 isolates equipment ground and attenuates any interactive noise signal that appears on the grounds of the equipment connected to the sockets 15–17. Use of bifilar winding for the inductors L1 and L3 prevents saturation of the core 36 with high line currents.

Additional protection is provided by the capacitors C1–3 that filter out AC power line hash and noise that may be detrimental to the connected equipment. The capacitors C1 and C2 provide common mode bypassing while the capacitor C3 provides differential bypassing. Thus, the device 11 provides a simple, compact unit that can effectively protect multiple pieces of electronic equipment from either damaging power line surges or performance degrading noise and interference.

Figure 6:
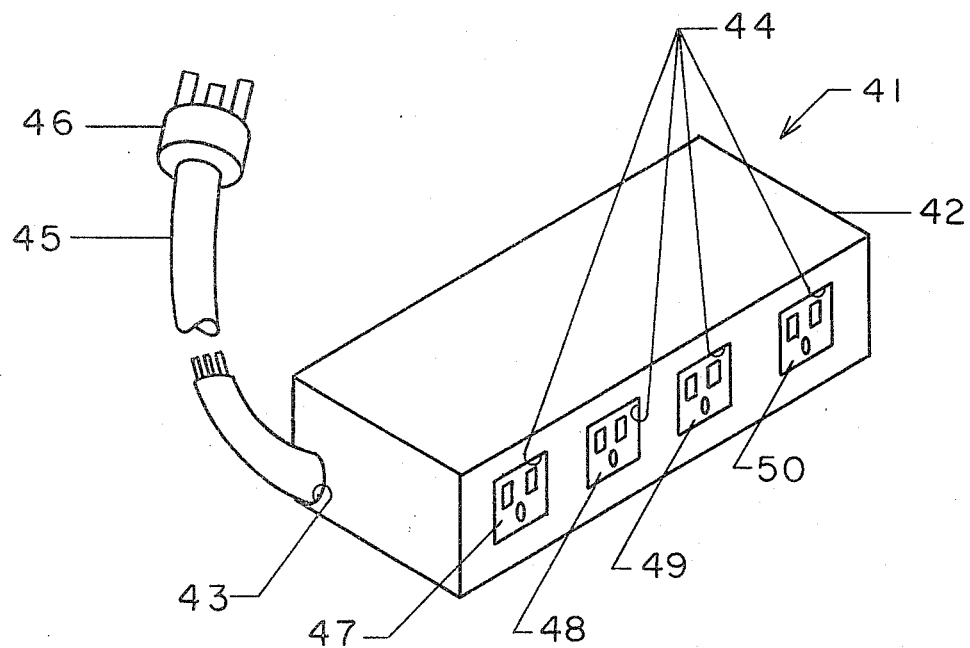
FIG. 6 is a schematic perspective view of another embodiment of the invention.

Referring now to FIG. 6, there is shown another embodiment of the invention. The embodiment 41 includes a housing 42 that defines a cord opening 43 and a plurality of receptacle openings 44. Extending through the cord opening 43 is an electrical cord 45 terminating with an electrical plug 46 adapted for insertion into an AC power source. A plurality of three-terminal electrical sockets 47–50 are retained by the socket openings 44.

Figure 7:
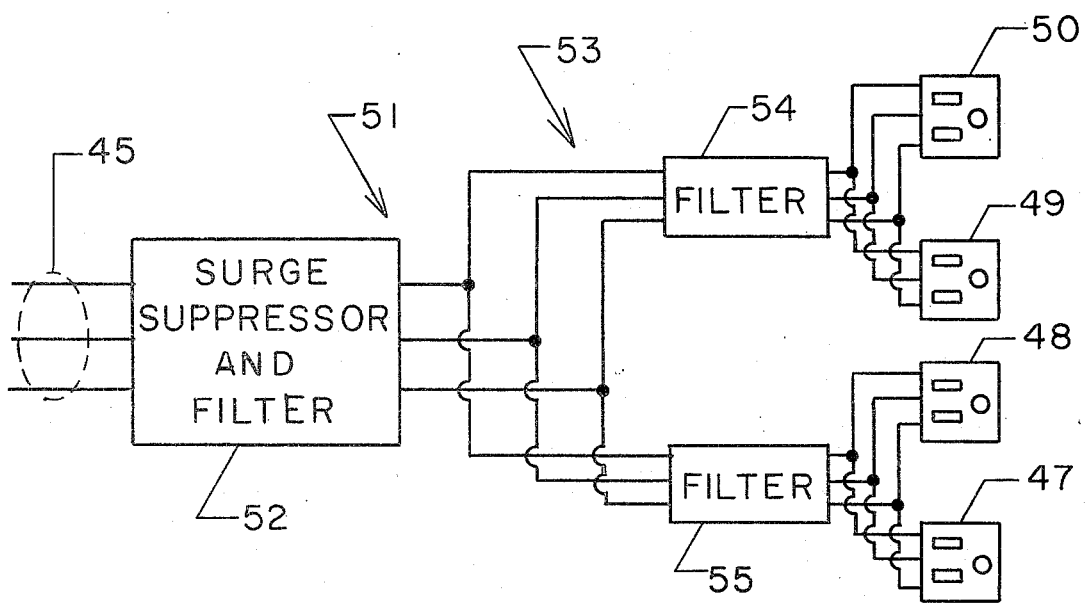
FIG. 7 is a schematic block circuit diagram of the embodiment shown in FIG. 6.

Schematically illustrated in FIG. 7 is an electrical circuit 51 retained by the housing 42 of FIG. 6. Included in the circuit 51 is a surge suppressor and filter combination 52 that is connected to the electrical cord 45 and is identical to the circuit illustrated in FIG. 3. A circuit 53 connects a pair of filters 54 and 55 in a parallel combination that is connected to the surge suppressor and filter combination 52. Each of the filters 54 and 55 is identical to the filter 28 shown in FIG. 4. Connected to the filter 55 is a parallel combination of the sockets 47 and 48 while a parallel combination of the sockets 49 and 50 is connected to the filter 54.

The combination 41 is used in a similar fashion to the embodiment 11 shown in FIG. 1. Again, the unit 41 is energized by insertion of the plug 46 into a suitable AC power source. A plurality of electrical devices can then be energized from the electrical sockets 47–50. The surge suppressor and filter combination 52 provides line surge protection and common mode bypassing in the same manner as the surge suppressor and filter combination 26 of FIG. 2. In addition, the filters 54 and 55 provide electrical isolation for the equipment connected to the sockets 47–50 in the same manner as the filters 28–30 of FIG. 2. However, in embodiment 41 complete isolation is not provided between the particular devices connected to the sockets 47 and 48 or between the devices connected to the sockets 49 and 50. The embodiment 41 is used in those instances in which complete filter isolation is not required between all individual units of an electrical system.

Obviously, many modifications and variations of the present invention are possible in light of the above teachings. For example only, cascaded filters could be substituted for individual filters or the number of parallel filters in a given unit can be increased as desired. Similarly, the number of individual sockets connected to a given filter in the embodiment 41 can be increased as desired. It is to be understood, therefore, that the invention can be practiced otherwise than as specifically described.

What is claimed is:

1. An electronic isolation and surge suppression system comprising:
a housing defining a connector opening and a plurality of socket openings;
an electrical connector extending through said connector opening and comprising a plurality of electrical conductors, each having one end located externally of said housing and an opposite end located internally thereof; said externally located ends adapted for connection to a source of AC power;
a voltage surge suppressor means disposed within said housing and connected to said internal ends of said conductors;
a plurality of multiple terminal electrical socket means mounted in said socket openings and adapted to receive electrical plugs; and
electrical circuit means connecting said socket means in a parallel combination and connecting said parallel combination in series with said suppressor means, said circuit means comprising a separate electrical filter means connected between each of said socket means and said suppressor means.

2. A system according to claim 1 wherein said suppressor means comprises voltage clipper means connected between said conductors.

3. A system according to claim 2 wherein said circuit means comprises a plurality of electrical lines connecting the multiple terminals of each of said socket means to said electrical conductors, and said filter means comprises an inductor in each of said lines.

4. A system according to claim 3 wherein said electrical conductors comprise three electrical conductors, and said circuit means comprise those lines connecting each of said socket means to said conductors.

5. A system according to claim 4 wherein all of said lines connecting one of said socket means to said conductors are wound on a common toroidal core to form said inductors.

6. A system according to claim 5 wherein each of said socket means comprises a plurality of multiple terminal electrical sockets connected in parallel.

7. A system according to claim 4 wherein said clipper means comprises a clipper connected between each pair of said three conductors.

8. A system according to claim 7 wherein said clippers are varistors.

* * * * *